United States Patent

Yamazaki

[11] Patent Number: 5,931,693
[45] Date of Patent: Aug. 3, 1999

[54] STRUCTURE OF TERMINAL FOR COIN-SHAPED BATTERY

[75] Inventor: Hideaki Yamazaki, Yokohama, Japan

[73] Assignee: Matsushita Electric Industrial Co., Ltd., Osaka, Japan

[21] Appl. No.: 08/966,191

[22] Filed: Nov. 7, 1997

Related U.S. Application Data

[63] Continuation of application No. 08/580,271, Dec. 28, 1995, abandoned.

[30] Foreign Application Priority Data

Dec. 28, 1994 [JP] Japan ................................. 6-328501

[51] Int. Cl.$^6$ ....................................................... H01R 3/00
[52] U.S. Cl. ............................................. 439/500; 439/96
[58] Field of Search ................................ 439/500, 38, 39, 439/40, 627; 429/96, 97, 98, 99, 100

[56] References Cited

U.S. PATENT DOCUMENTS

| | | | |
|---|---|---|---|
| 5,077,572 | 12/1991 | Morisawa | 429/96 |
| 5,188,912 | 2/1993 | Katoh et al. | 429/96 |
| 5,203,709 | 4/1993 | Huang | 439/38 |
| 5,552,240 | 9/1996 | Derstine | 429/97 |

FOREIGN PATENT DOCUMENTS

| | | | |
|---|---|---|---|
| 0168355 | 12/1981 | Japan | 429/97 |
| 56-168355 | 12/1981 | Japan | 429/97 |

*Primary Examiner*—Paula Bradley
*Assistant Examiner*—Tho Dac Ta
*Attorney, Agent, or Firm*—McDermott, Will & Emery

[57] ABSTRACT

An improved terminal apparatus is provided for electrical connections to a coin-shaped battery of a kind which may be employed in portable electronic equipment. The terminal apparatus includes a positive terminal plate for engaging a side surface (i.e., a positive electrode) of the coin-shaped battery and a negative terminal plate for engaging the bottom (i.e., a negative electrode) of the battery. The positive terminal plate is geometrically oriented so as to establish constant engagement with the side surface of the battery when placed in a battery holder. In a preferred embodiment of the invention, the positive terminal plate is made of a spring member and is curved toward the battery holder to elastically urge the side surface of the battery for constant engagement therewith. Alternatively, the positive terminal plate includes a hook portion engaging the side surface of the battery when placed in the battery holder. Further, the positive terminal plate has formed thereon a magnetized portion for attracting the side surface of the battery when placed in the battery holder for establishing constant engagement therewith.

16 Claims, 8 Drawing Sheets

STRUCTURE OF TERMINAL FOR COIN-SHAPED BATTERY

This application is a continuation of application Ser. No. 08/580,271 filed Dec. 28, 1995 now abandoned.

BACKGROUND OF THE INVENTION

1. Technical Field

The present invention relates generally to an improved structure of a terminal apparatus for electrical connections to a coin-shaped battery which may be employed in portable electronic equipment.

2. Background of the Related Art

Figure 12:
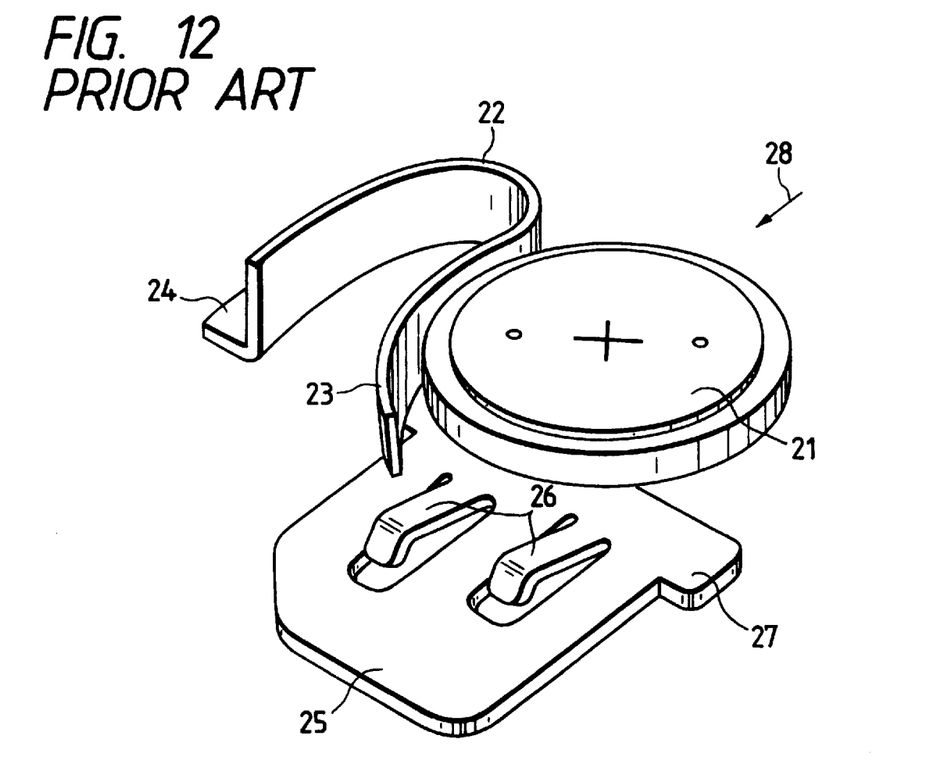
FIG. 12 is a perspective view which shows a conventional terminal apparatus.
Figure 13:
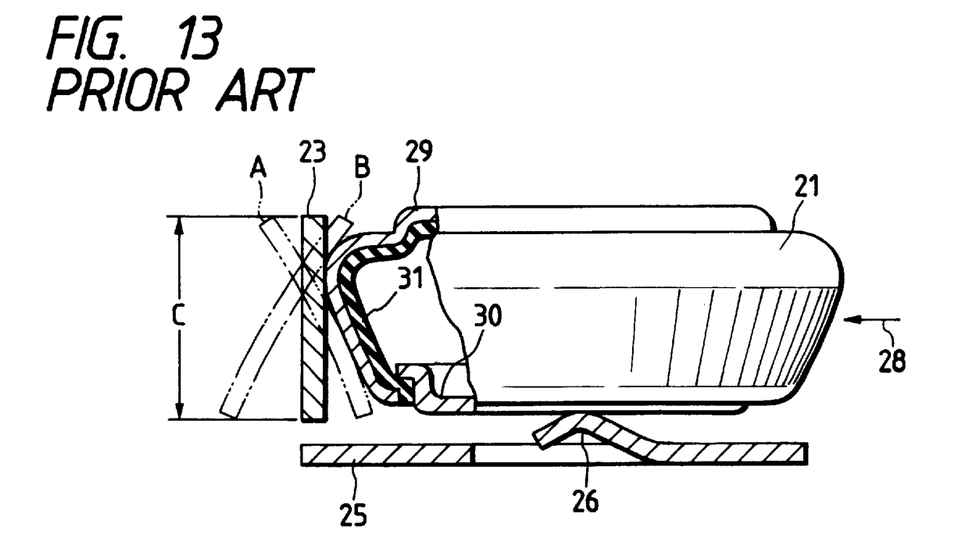
FIG. 13 is a cross sectional view which shows engagement of a contact portion of the terminal apparatus shown in FIG. 12 and a coin-shaped battery.

FIGS. 12 and 13 show a conventional terminal apparatus for electrical connections to a coin-shaped battery which generally includes a positive terminal plate 22 and a negative terminal plate 25 both made of plate springs. The positive terminal plate 22 consists of a contact portion 23 and a connecting portion 24. The contact portion 23 supported to be engageble with a peripheral side surface of a coin-shaped battery 21. The connecting portion 24 is welded or soldered to a printed-circuit board (not shown). The negative terminal plate 25 consists of a pair of contacts contacting with the bottom of the battery 21 and a connecting portion 27 welded or soldered to the printed-circuit board. The battery 21, is inserted in the direction of arrow 28 as can be seen from FIG. 13, and has a positive electrode 29 and a negative electrode 30. The positive electrode 29 ranges from the upper surface to the side surface of the battery 21, while the negative electrode 30 is formed only on the bottom. In the prior art device per FIG. 13, there may also be included an insulating element 31 which insulates positive terminal 29 from the negative terminal 30. The battery 21, when placed on the terminal apparatus, by insertion in the direction indicated by arrow "28" engages the pair of contacts 26 at the bottom (i.e., the negative electrode 30) and the contact portion 23 at the side surface (i.e., the positive electrode 29).

It is preferable that the contact portion 23 be oriented so as to extend perpendicular to the negative terminal plate 25 for secure engagement with the positive electrode 29 of the battery 21. The contact portion 23 may, however, be inclined, as shown by broken lines A and B in FIG. 13, relative to the negative terminal plate 25 because of locational error during assembling, for example. If the contact portion 23 is inclined outward, as shown by the broken line A, the side surface of the battery 21 is lifted up along a side wall of the contact portion 23, thereby causing the bottom (i.e., the negative electrode 30) of the battery 21 to fail to make contact with the contacts 26 of the negative terminal plate. Alternatively, if the contact portion 23 is inclined inward, as shown by the broken line B, the side surface of the battery 21 is urged downward, thereby resulting in a short circuit between a lower corner of the side surface (i.e., the positive electrode 29) of the battery 21 and the negative terminal plate 25 or the printed-circuit board. This leads to a malfunction of an electronic circuit. If the height C of the contact portion 23 is increased for avoiding such a drawback, it may further cause the contact portion 23 to be deformed elastically or permanently.

SUMMARY OF THE INVENTION

It is therefore a principal object of the present invention to avoid the disadvantages of the prior art.

It is another object of the present invention to provide an improved structure of a terminal apparatus for electrical connections to a coin-shaped battery which is capable of making contact between positive and negative electrodes of the battery and positive and negative terminals of the electric terminal apparatus even if a terminal plate for contact with a side surface of the battery is inclined undesirably.

According to one aspect of the present invention, there is provided a terminal apparatus for electrical connections to a coin-shaped battery which comprises a first terminal plate for establishing engagement with a side surface of the coin-shaped battery; a second terminal plate for establishing engagement with a bottom of the coin-shaped battery; a first hook portion provided on the first terminal plate urging a first portion of the coin-shaped battery toward said second terminal plate; a battery holder having an inner wall defining an opening for holding therein the coin-shaped battery; and a second hook portion provided on the first terminal plate.

In the preferred mode of the invention, the first terminal plate has a given length to form a stationary end portion and a movable end portion opposite the stationary end portion. The movable end portion is provided for making an electrical connection to the side surface of the coin-shaped battery. The first hook portion is provided on the movable end portion and has elasticity to urge the first portion of the side surface of the coin-shaped battery toward the second terminal plate. The second hook portion is provided on the movable end portion and having elasticity to urge the second portion of the side surface of the coin-shaped battery in a direction substantially perpendicular to the thickness of the coin-shaped battery.

A battery holder is further provided which has an inner wall defining an opening for holding therein the side surface of the coin-shaped battery. The second hook portion is formed so as to urge the second portion of the side surface of the coin-shaped battery toward the inner wall of the battery holder.

The inner wall of the battery holder engages a first area of the side surface of the coin-shaped battery when placed on the second terminal plate. The second hook portion is formed so as to urge the second portion defined on a second area of the side surface of the coin-shaped battery opposite the first area.

A first stopper is provided which urges the side surface of the coin-shaped battery toward the inner wall of the battery holder.

A second stopper is provided which restricts movement of the movable end portion of the first terminal plate in a direction away from the side surface of the coin-shaped battery when the coin-shaped battery engages the movable end portion.

The first hook portion is oriented at a given angle to the first terminal plate for making a connection to the first portion of the side surface of the coin-shaped battery when placed on the second terminal plate. The second hook portion is oriented at a given angle to the first terminal plate for making a connection to the second portion of the side surface of the coin-shaped battery.

A magnetized portion is formed on a portion of the first terminal plate for attracting the side surface of the coin-shaped battery to establish constant engagement therewith.

According to another aspect of the present invention, there is provided a terminal apparatus for electrical connections to a coin-shaped battery which comprises a first terminal plate for engaging a side surface of the coin-shaped battery, the first terminal plate being curved so as to surround the side surface of the coin-shaped battery retained at a given placed of the terminal apparatus; and a second terminal plate for engaging a bottom of the coin-shaped battery.

In the preferred mode of the invention, the first terminal plate is curved with a preselected curvature.

The first terminal plate has a given length and is bent at a preselected angle along a center line extending in a lengthwise direction thereof.

A magnetized portion is formed on a portion of the first terminal plate for attracting the side surface of, the coin-shaped battery to establish constant engagement therewith.

According to a further aspect of the present invention, there is provided a terminal apparatus for electrical connections to a coin-shaped battery which comprises a first terminal plate designed for engaging a side surface of the coin-shaped battery; a second terminal plate designed for engaging a bottom of the coin-shaped battery; and a magnetized portion formed on a portion of the first terminal plate for attracting the side surface of the coin-shaped battery to establish constant engagement therewith.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENTS

Figure 1:
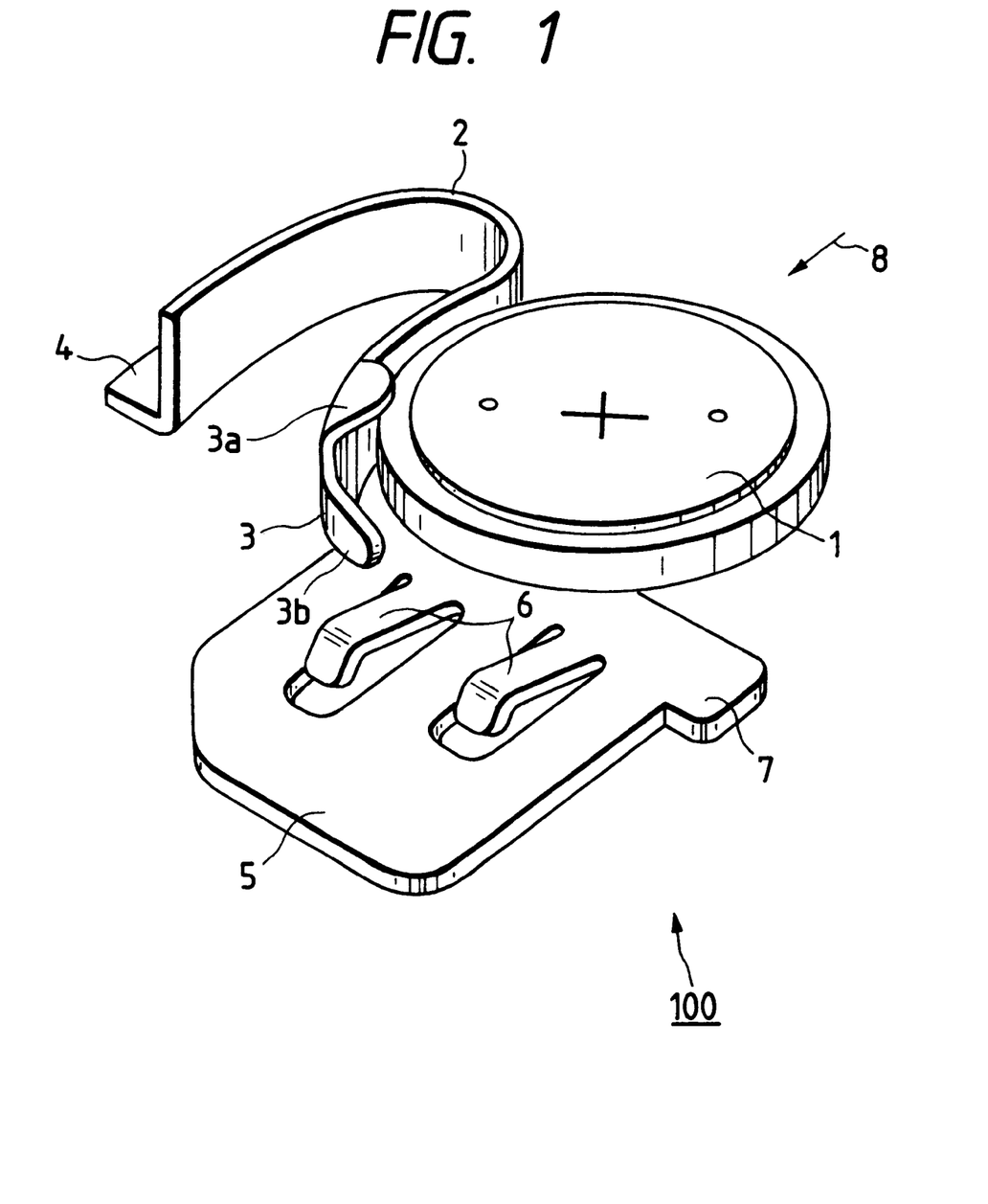
FIG. 1 is a perspective view which shows a terminal apparatus according to the first embodiment of the invention.

Referring now to the drawings, particularly to FIG. 1, there is shown a terminal apparatus 100 according to the present invention which is designed to hold a coin-shaped battery used in, for example, a portable electronic device for making constant electrical connections to the battery.

The terminal apparatus 100 generally includes a positive terminal plate 2 and a negative terminal plate 5 both made of plate springs. The positive terminal plate 2 is curved in a lengthwise direction to have a U-shape and includes a contact portion 3 formed on one end thereof and a connecting portion 4 formed on the other end thereof. The connecting portion 4 is welded or soldered to a printed-circuit board (not shown). The contact portion 3 is elastically supported by the connecting portion 4 for constant engagement with a peripheral side surface (i.e., a positive electrode) of a coin-shaped battery 1. The negative terminal plate 5 includes a pair of contact strips 6 and a connecting portion 7. Each of the contact strips 6 is, as apparent from the drawing, made by cutting a portion of the negative terminal plate 5 to form a spring strip, raising it upward, and bending an end thereof downward to form a negative spring contact for a constant electrical connection with the bottom (i.e., a negative electrode) of the battery 1. The connecting portion 7 is welded or soldered to the printed circuit board.

Figure 6:
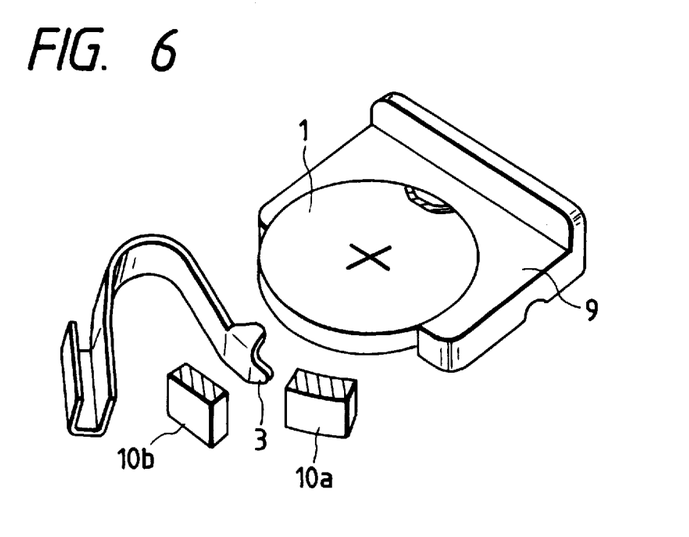
FIG. 6 is a perspective view which shows a contact portion of a terminal apparatus and a coin-shaped battery retained in a battery holder.

The terminal apparatus 100 further includes a battery holder 9, as shown in FIG. 6, which is arranged on the negative terminal plate 5. The battery holder 9 has a semicircular inner wall defining an opening for retaining therein the battery 1.

Figure 2A:
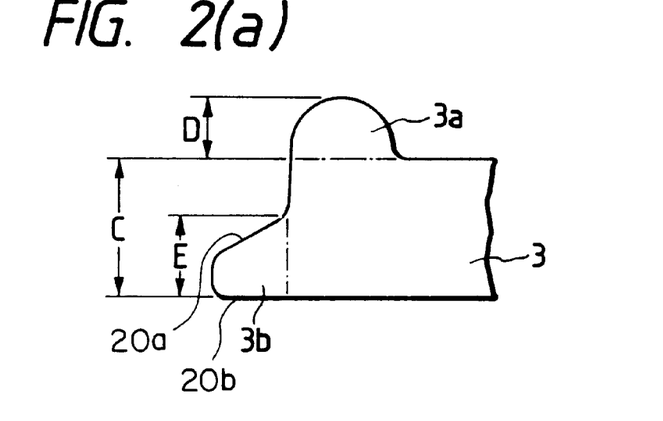
FIG. 2(a) is a development which shows a contact portion of a terminal apparatus.
Figure 2B:
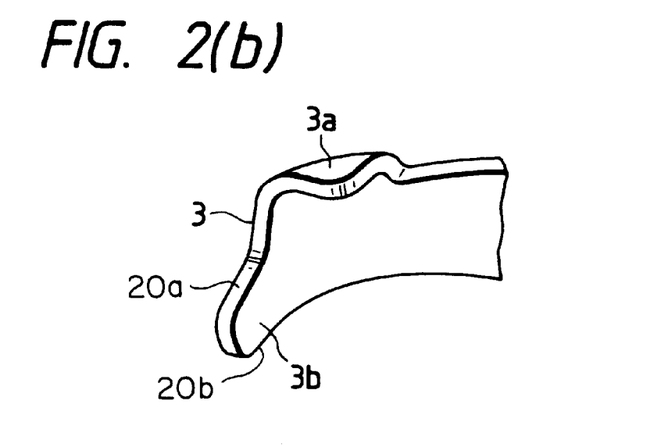
FIG. 2(b) is a partial perspective view which shows a contact portion of a terminal apparatus.
Figure 2C:
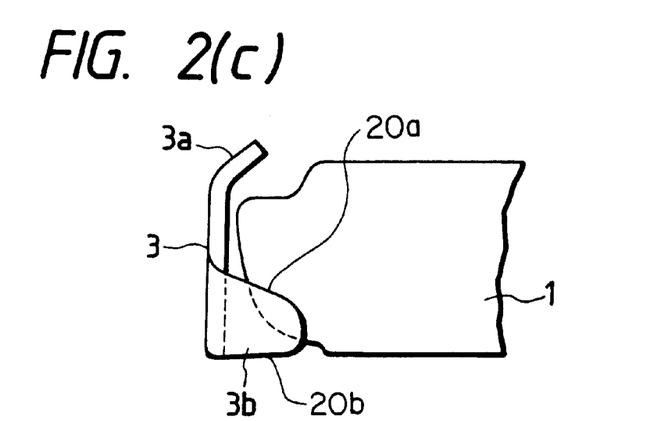
FIG. 2(c) is a side view which shows a positional relation between a contact portion of a terminal apparatus and a coin-shaped battery.

The contact portion 3 of the positive terminal plate 2, as shown in FIGS. 2(a) to 2(c), has an upper hook portion 3a and a side hook portion 3b. The upper hook portion 3a, as can be seen in FIG. 2(a) of a development, is made of a semicircular protrusion having the height D in a width-wise direction of the contact portion 3 which is approximately one-half the width C of the contact portion 3. The upper hook portion 3a, as shown in FIGS. 2(b) and 2(c), is bent inward at a given angle for elastically urging an upper corner of the battery 1 toward the negative terminal plate 5. The side hook portion 3b is made of a trapezoid protrusion defined by a tapered upper surface 20a and a flat bottom surface 20b continuing the bottom of the contact portion 3. Side hook portion 3b has a maximum height E which is approximately one-half the width C of the contact portion 3. The side hook portion 3b, similar to the upper hook portion 3a, is bent inward at a given angle for elastically urging a lower side wall of the battery 1 toward the inner wall of the battery holder 9 (i.e., in a direction substantially perpendicular to the thickness of the battery 1) to hold the battery 1 tightly.

Figure 3:
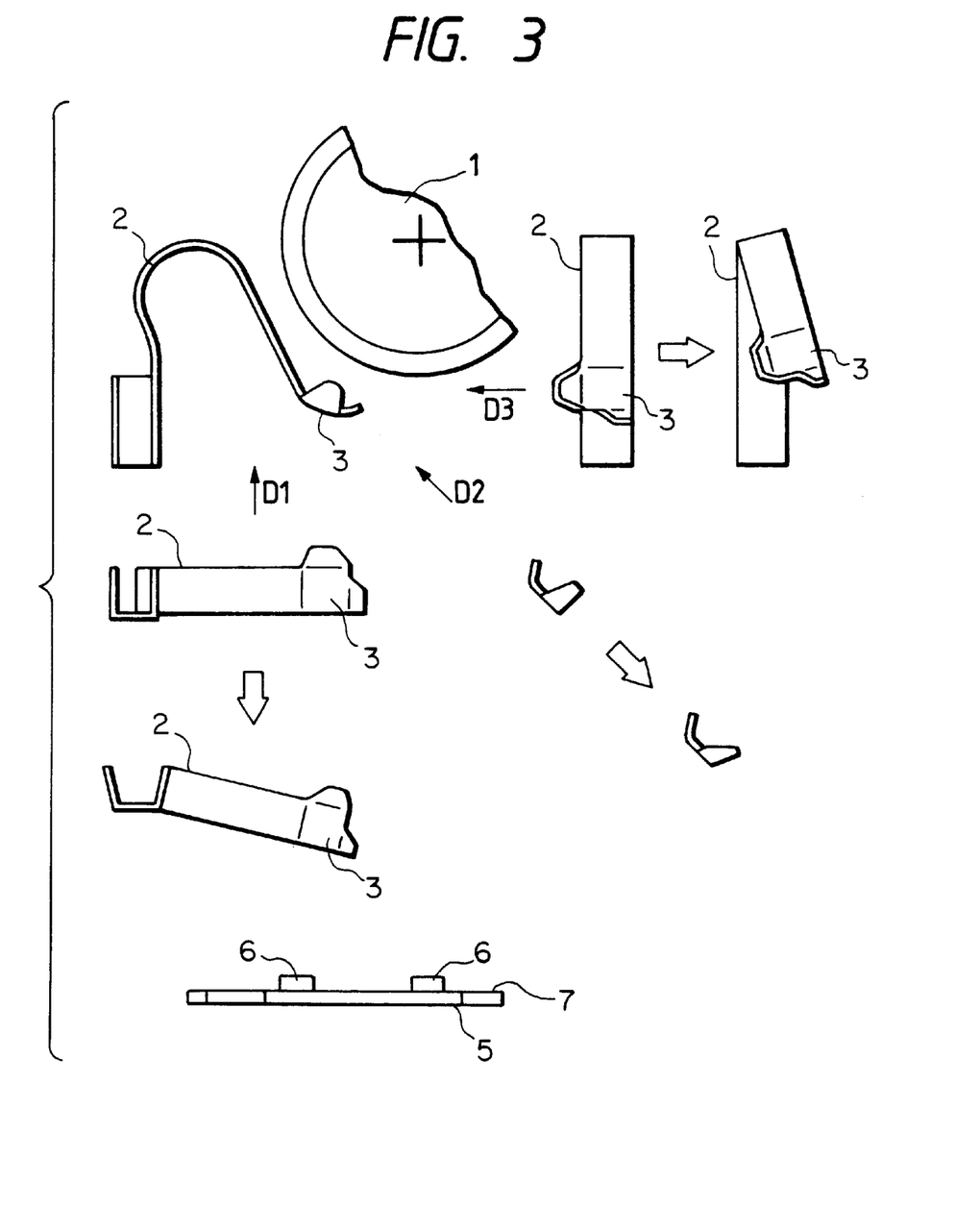
FIG. 3 is an illustration which shows a contact portion of a terminal apparatus which is undesirably inclined.

FIG. 3 shows the positive terminal plate 2 which is undesirably inclined to the negative terminal plate 5 for some reason such as locational error when installed on a printed-circuit board or deformation created during machining, for example. The contact portion 3 is deformed as indicated by arrows as viewed from directions D1 to D3.

Figure 4:
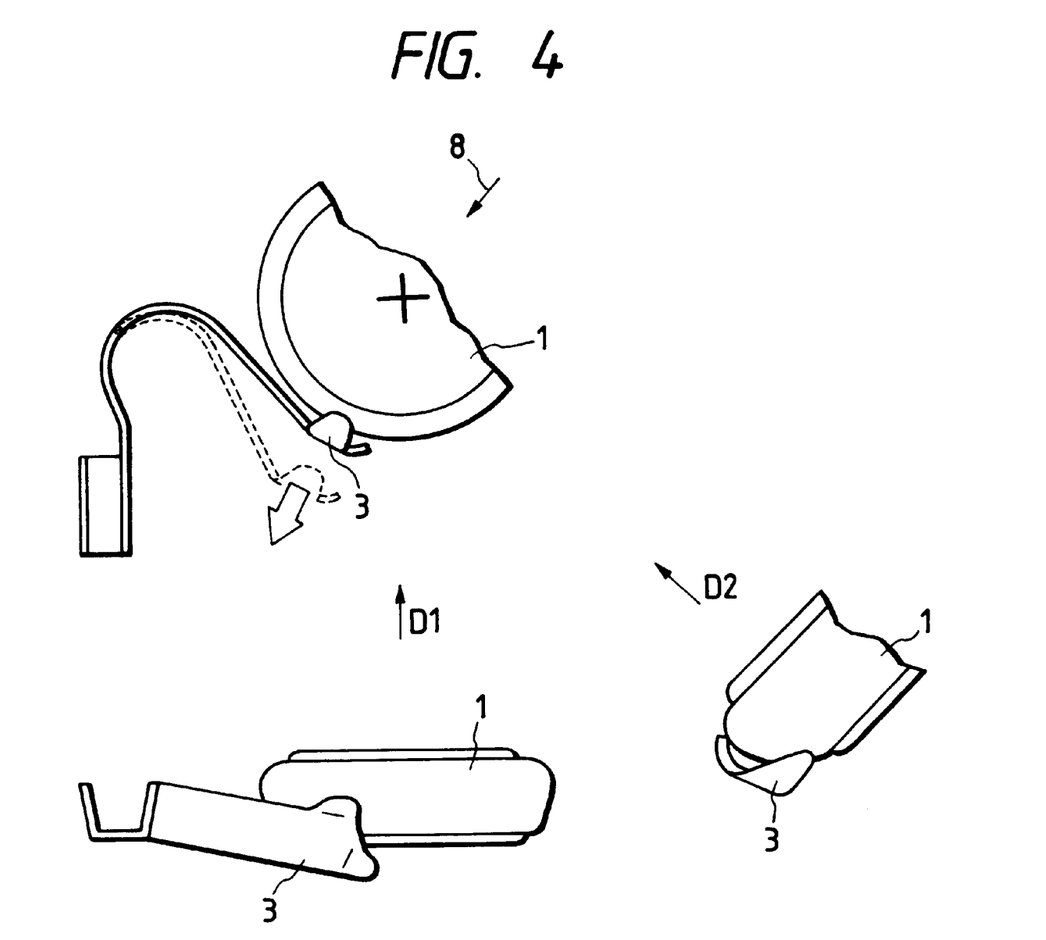
FIG. 4 is an illustration which shows engagement of a contact portion of a terminal apparatus with a coin-shaped battery.

When the battery 1 is inserted into the thus deformed terminal apparatus 100 from a direction 8, as shown in FIG.

Figure 5A:
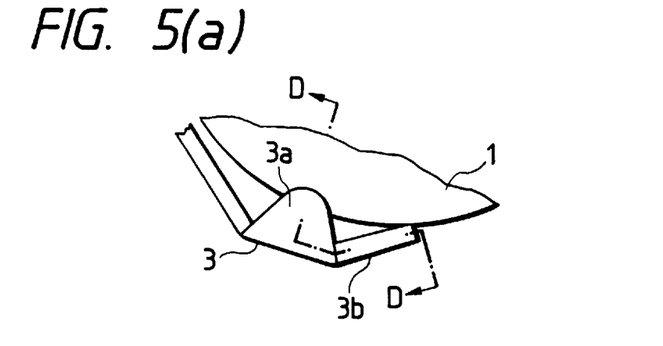
FIG. 5(a) is a partial plan view which shows engagement of an inclined contact portion of a terminal apparatus with a coin-shaped battery.
Figure 5B:
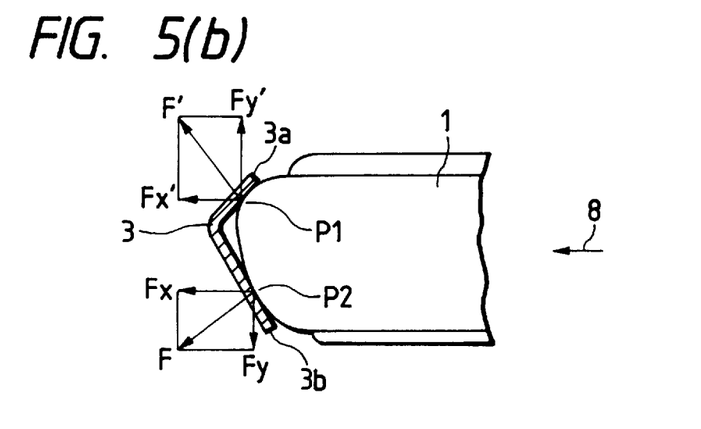
FIG. 5(b) is a cross sectional view taken along the line D in FIG. 5(a)

4, the side surface of the battery 1 presses the contact portion 3 outward, so that the contact portion 3 is deformed. FIG. 5(b) shows directions of forces acting on the contact portion 3 from the battery 1 when the side surface of the battery 1 presses the contact portion 3 outward. FIG. 5(b) is a cross sectional view taken along the line D in FIG. 5(a).

When the battery 1 presses the contact portion 3 outward, it engages the upper hook portion 3a at the point P1 and the lower hook portion 3b at the point P2, so that forces F' and F act on the upper and lower hook portions 3a and 3b, respectively, generating horizontal component forces Fx' and Fx and vertical component forces Fy' and Fy. The contact portion 3 is formed opposite the connecting portion 4 secured on the printed-circuit board so as to be elastically movable in vertical directions as well as horizontal directions. Thus, increase in the forces F' and F causes the contact portion 3 to be moved to a location where the vertical component forces Fy' and Fy are balanced with each other.

Figure 7:
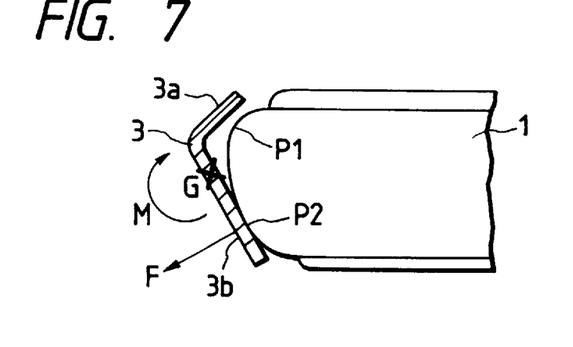
FIG. 7 is a cross sectional view which shows movement of an inclined contact portion of a terminal apparatus when a coin-shaped battery presses the contact portion.

After completion of the insertion of the battery 1, the battery 1 is, as shown in FIG. 6, retained by the battery holder 9 provided on the negative terminal plate 5. Thus, even if a portable electronic device in which the terminal apparatus 100 is built is dropped carelessly on the ground and then subjected to an external force or impact, the battery 1 is not dislodged from the upper and lower hook portions 3a and 3b as long as the battery is retained by the battery holder 9. Specifically, when the impact acts on the connecting portion 3 so that the balance of the vertical component forces Fy' and Fy (i.e., Fy'=Fy) is lost, the upper and lower hook portions 3a and 3b move along the side surface of the battery 1, but the battery 1 will not be dislodged from the upper and lower hook portions 3a and 3b unless the impact is greater than the sum of the vertical component forces Fy' and Fy. In this embodiment, since the contact portion 3 is elastically supported by the connecting portion 4 so as to be movable in a rotational direction as well as vertical and horizontal directions, even if the positive terminal plate 2 is inclined counterclockwise, as shown in FIG. 7, to orient the upper hook portion 3a away from the side surface of the battery 1, the torque or rotation moment M acts on the contact portion 3 with respect to the center of gravity G upon engagement of the battery 1 with the contact portion 3a at the point P2, thereby causing the upper hook portion 3a to be brought into engagement with the side wall of the battery 1. The same is true for the case where the positive terminal plate is inclined clockwise to orient the lower hook portion 3b away from the side surface of the battery 1.

If the possibility of the upper and lower hook portions 3a and 3b both disengaging from the battery 1 is high, it is desirable that the elasticity or spring force of the contact portion 3 be increased. Alternatively, a stopper 10a, as shown in FIG. 6, may be provided to restrict movement of the battery 1 or a stopper 10b may be provided to minimize outward movement of the contact portion 3 for holding the battery 1 in the battery holder 9.

Figure 8:
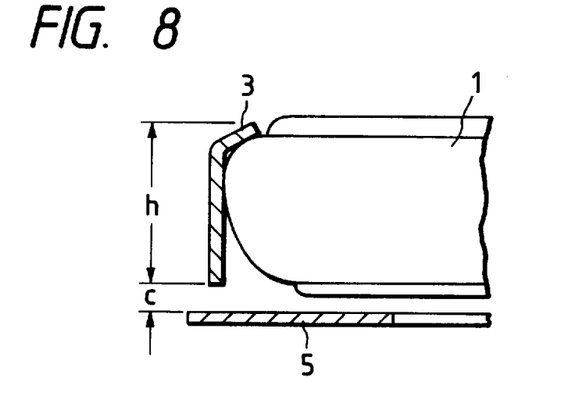
FIG. 8 is a cross sectional view which shows a relation between the height of a contact portion of a terminal apparatus and a clearance between a bottom of the contact portion and a negative terminal plate.
Figure 9:
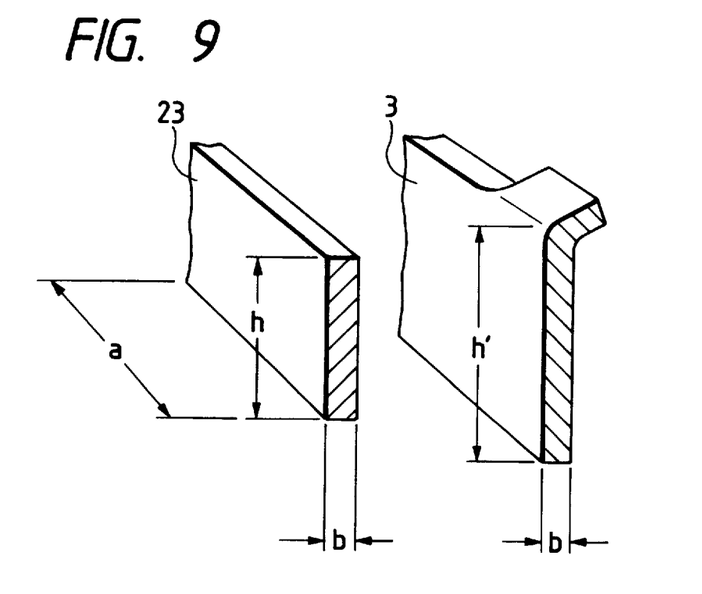
FIG. 9 is a partial perspective view which shows a dimensional relation between a contact portion of the invention and a contact portion of a conventional terminal apparatus.

With the above arrangements of the terminal apparatus 100, it is possible to decrease the clearance C, as shown in FIG. 8, between the negative terminal plate 5 and the bottom of the positive terminal plate 2 because the engagement of the battery 1 with the upper hook portion 3a prevents the contact portion 3 from being shifted downward. This allows the height h of the contact portion 3a to be increased to enhance the flexing resistance of the contact portion 3a. Compared with a conventional contact portion 23, as shown in FIG. 9, having the same length a and thickness b as those of the contact portion 3 of this embodiment, but having a smaller height h', the bending stress acting on a unit area of the contact portion 3 is, as will be apparent from equations below, decreased, resulting in decreased set against the same bending stress. Therefore, even if the contact portion 3 is made of a material having a high spring constant, the contact portion 3 can withstand permanent set.

$$Z = \frac{bh^2}{6}$$

$$\sigma = \frac{M}{Z}$$

$$\sigma = \frac{6M}{bh^2} \quad \sigma' = \frac{6M}{bh'^2}$$

Since h<h', we obtain $\Sigma > \sigma'$ where Z is modulus of section, $\sigma$ is bending stress, and M is bending moment.

Figure 10A:
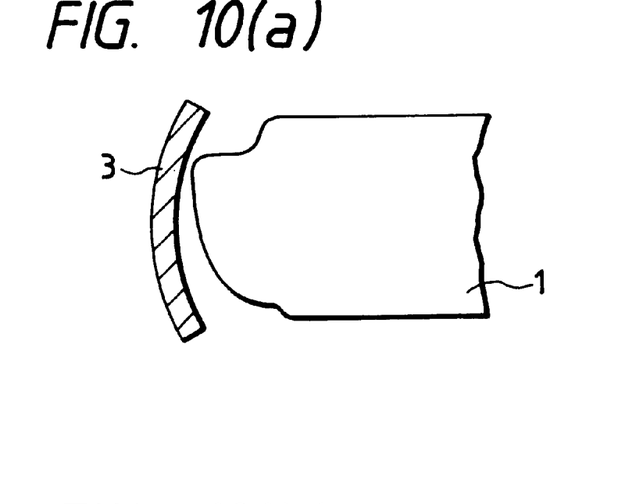
FIGS. 10(a) and 10(b) are cross sectional views which show first and second alternative embodiments of a contact portion of a terminal apparatus.
Figure 10B:
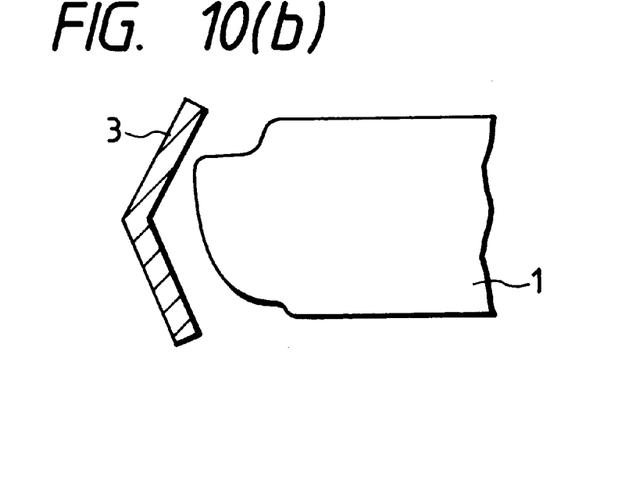

Referring to FIGS. 10(a) and 10(b), alternative embodiments of the terminal apparatus 100 are shown.

FIG. 10(a) is a cross sectional view showing the contact portion 3 of the positive terminal plate 2 which is curved inward with a given curvature so as to surround the side surface (i.e., the positive electrode) of the battery 1 vertically. Thus, even when the contact portion 3 is inclined outward or inward, so that it engages the battery 1 at two contact points, the activity of rotation moment acting on the contact portion 3 establishes constant engagement with the battery 1.

FIG. 10(b) is a cross sectional view showing the contact portion 3 which is bent inward along the center line extending in a lengthwise direction. In this case, the contact portion 3 engages the side surface of the battery 1 at two points. Therefore, the activity of rotation moment acting on the contact portion 3, similar to the above embodiments, establishes secure engagement with the battery 1 even if the contact portion 3 is inclined relative to the negative terminal plate 5 in any directions.

Figure 11:
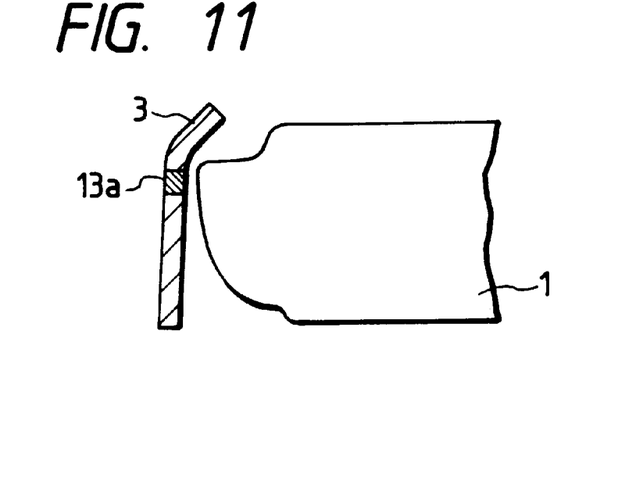
FIG. 11 is a cross sectional view which shows a third alternative embodiment of a contact portion of a terminal apparatus.

FIG. 11 shows a third alternative embodiment of the contact portion 3 including a partly magnetized portion 13a which attracts a portion of the side surface of the battery 1 for making constant electrical connection thereto. Thus, even if the contact portion 3 is undesirably inclined inward or outward, the contact portion 3 is brought into engagement with the side surface of the battery 1 quickly and securely upon insertion of the battery 1 to the terminal apparatus 100.

The third alternative embodiment in FIG. 11 may be used with the ones shown in FIG. 1 and FIGS. 10(a) and 10(b). In this case, it is advisable that two magnetized portions be formed on the contact portion 3 in a vertical direction.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A terminal apparatus for electrical connections to a coin-shaped battery comprising:

a battery holder having a substantially semi-circular inner wall that defines an opening in which the coin-shaped battery is received with a side surface thereof in engagement with the semi-circular inner wall;

a single first terminal plate for establishing engagement with the side surface of the coin-shaped battery;

a second terminal plate for establishing engagement with a bottom of the coin-shaped battery;

a first hook portion provided on said first terminal plate for producing a bias which urges a first portion of the coin-shaped battery toward said second terminal plate; and a second hook portion provided on said first terminal plate so as to face the semi-circular inner wall of said battery holder, said second hook portion producing a bias which urges the side surface of the coin-shaped battery into constant engagement with the semi-circular inner wall of said battery holder.

2. The terminal apparatus according to claim 1, wherein:

said first hook portion is oriented at a given angle to said first terminal plate for making a connection to the first portion of the side surface of the coin-shaped battery when placed on said second terminal plate, and wherein said second hook portion is oriented at a given angle to said first terminal plate for making a connection to the second portion of the side surface of the coin-shaped battery.

3. The terminal apparatus according to claim 1, further comprising:

a magnetized portion formed on a portion of said first terminal plate for attracting the side surface of the coin-shaped battery to establish constant engagement therewith.

4. The apparatus according to claim 1, wherein:

the first portion of the coin-shaped battery is an upper corner thereof, and the second portion of the coin-shaped battery is a side surface thereof.

5. The terminal apparatus according to claim 1, wherein:

said first terminal plate has a given length to form a stationary end portion and a movable end portion opposite the stationary end portion, the movable end portion being provided for making an electrical connection to the side surface of the coin-shaped battery, and said first hook portion is provided on the movable end portion and has elasticity to urge the first portion of the side surface of the coin-shaped battery toward the second terminal plate, said second hook portion being provided on the movable end portion and having elasticity to urge the second portion of the side surface of the coin-shaped battery in a direction substantially perpendicular to the thickness of the coin-shaped battery.

6. The terminal apparatus according to claim 5, wherein:

the inner wall of said battery holder engages a first area of the side surface of the coin-shaped battery when placed on said second terminal plate, and said second hook portion is formed so as to urge the second portion defined on a second area of the side surface of the coin-shaped battery opposite the first area.

7. The terminal apparatus according to claim 6, further comprising:

a stopper urging the side surface of the coin-shaped battery toward the inner wall of said battery holder.

8. The terminal apparatus according to claim 7, further comprising:

a stopper restricting movement of the movable end portion of said first terminal plate in a direction away from the side surface of the coin-shaped battery when the coin-shaped battery engages the movable end portion.

9. A terminal apparatus for electrical connections to a coin-shaped battery comprising:

a battery holder having a substantially semi-circular inner wall that defines an opening in which the coin-shaped battery is received in a manner wherein the semi-circular inner wall engages a first portion of a side surface of the coin-shaped battery;

a single first terminal plate having an end portion which is curved so as to be contoured to a second portion of the side surface of the coin-shaped battery which is out of engagement with the semi-circular inner wall, and which establishes engagement with the side surface of the coin-shaped battery;

a second terminal plate for establishing engagement with a bottom of the coin-shaped battery;

a first hook portion provided on the end portion of said first terminal plate for biasing a first portion of the coin-shaped battery toward said second terminal plate; and a second hook portion provided on the end portion of said first terminal plate so as to face the semi-circular inner wall of said battery holder, said second hook portion biasing a second portion of the coin-shaped battery into constant engagement with the semi-circular inner wall of said battery holder.

10. A terminal apparatus for electrical connections to a coin-shaped battery comprising:

a battery holder having a substantially semi-circular inner wall defining an opening for receiving the battery in a manner wherein a portion of a peripheral side wall of the battery is in engagement with the semi-circular inner wall;

a single first terminal strip for establishing engagement with the peripheral side wall of the battery, said first terminal strip having a length facing the peripheral side wall of the battery;

a second terminal plate for establishing engagement with a lower surface of the battery;

a first hook portion extending from an upper portion of said first terminal strip, said first hook portion engaging an upper edge portion of the peripheral side wall and producing a spring bias urging the upper edge portion toward the second terminal plate; and a second hook portion extending from a lower portion of said first terminal strip, said second hook portion engaging a lower edge portion of the side wall and producing a spring bias urging the lower edge portion of the peripheral side wall of the battery toward the semi-circular inner wall.

11. The terminal apparatus according to claim 10, wherein:

said first terminal plate has a stationary end portion and a movable end portion, the movable end portion establishing an electrical connection with the peripheral side wall of the battery, said first hook portion is provided on a free end of the movable end portion and has elasticity to urge the upper edge portion of the peripheral side wall of the battery toward the second terminal plate, and said second hook portion is also provided on the movable free end of the movable end portion and has elasticity to urge the lower edge portion of the peripheral side wall of the battery in a direction substantially perpendicular to the thickness of the battery.

12. The terminal apparatus according to claim 10, wherein:

said first hook portion is oriented at a first given angle with respect to said first terminal plate for making a connection with the upper edge portion of the side wall of battery when the battery is seated on said second terminal plate, and wherein said second hook portion is oriented at a second given angle with respect to said first terminal plate for making a connection with the lower edge portion of the side wall of the battery.

13. The terminal apparatus according to claim 10, further comprising:

a magnetized portion formed on a portion of said first terminal plate which is located below and adjacent said first hook portion, for attracting the side wall of the battery and for establishing constant engagement between the battery and said first terminal plate.

14. The terminal apparatus according to claim 10, wherein:

the inner wall of said battery holder engages a first area portion of the side wall of the battery when seated on said second terminal plate, and said second hook portion engages a lower edge portion of a second area portion of the peripheral wall which is diametrically opposite the first area portion.

15. The terminal apparatus according to claim 14, further comprising:

a first stopper for engaging the side wall of the battery and for urging the battery toward the inner wall of said battery holder.

16. The terminal apparatus according to claim 15, further comprising:

a second stopper for engaging and restricting movement of the free end of said first terminal plate away from the side wall of the battery when the battery engages the movable end portion.

* * * * *